(12) United States Patent
Rodriguez et al.

(10) Patent No.: US 11,595,357 B2
(45) Date of Patent: Feb. 28, 2023

(54) IDENTIFYING DNS TUNNELING DOMAIN NAMES BY AGGREGATING FEATURES PER SUBDOMAIN

(71) Applicant: Cisco Technology, Inc., San Jose, CA (US)

(72) Inventors: David Brandon Rodriguez, Berkeley, CA (US); Thomas Manianghat Mathew, Sunnyvale, CA (US); Gilad Rainer, Vancouver (CA); Dhia Mahjoub, San Francisco, CA (US); Jingchuan Chen, Burnaby (CA); Christian Neufeld, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 377 days.

(21) Appl. No.: 16/816,797

(22) Filed: Mar. 12, 2020

(65) Prior Publication Data

US 2021/0126901 A1    Apr. 29, 2021

Related U.S. Application Data

(60) Provisional application No. 62/925,041, filed on Oct. 23, 2019.

(51) Int. Cl.
*H04L 9/40* (2022.01)
*G06N 20/00* (2019.01)
*H04L 61/4511* (2022.01)

(52) U.S. Cl.
CPC ........... *H04L 63/029* (2013.01); *G06N 20/00* (2019.01); *H04L 61/4511* (2022.05)

(58) Field of Classification Search
CPC .... H04L 63/029; H04L 61/4511; G06N 20/00
See application file for complete search history.

(56) References Cited

U.S. PATENT DOCUMENTS

| 8,260,914 B1 * | 9/2012 | Ranjan | H04L 63/12 709/224 |
|---|---|---|---|
| 10,270,744 B2 | 4/2019 | Yu et al. | |
| 10,326,736 B2 | 6/2019 | Rodriguez et al. | |
| 10,440,042 B1 | 10/2019 | Stein et al. | |

(Continued)

FOREIGN PATENT DOCUMENTS

WO    WO-2019-228613    12/2019

OTHER PUBLICATIONS

Farnham, Greg, "Detecting DNS Tunneling", Feb. 25, 2013, 32 pages, SANS Institute.

(Continued)

*Primary Examiner* — Jimmy H Tran
(74) *Attorney, Agent, or Firm* — Behmke Innovation Group LLC; Kenneth J. Heywood; Jonathon P. Western

(57) ABSTRACT

In one embodiment, a service computes a plurality of features of a subdomain for which a Domain Name System (DNS) query was issued. The service aggregates the plurality of computed features into a feature vector. The service uses the feature vector as input to a machine learning classifier, to determine whether the subdomain is a DNS tunneling domain name. The service provides an indication that the subdomain is a DNS tunneling domain name, when the machine learning classifier determines that the subdomain is a DNS tunneling domain name.

20 Claims, 7 Drawing Sheets

(56) References Cited

U.S. PATENT DOCUMENTS

| | | | |
|---|---|---|---|
| 10,616,179 B1* | 4/2020 | McCarriar | H04L 61/2514 |
| 10,848,509 B1* | 11/2020 | McNab | H04L 61/4511 |
| 2012/0042381 A1* | 2/2012 | Antonakakis | H04L 61/4511 726/22 |
| 2013/0111066 A1* | 5/2013 | Vempati | H04L 61/4511 709/245 |
| 2015/0365305 A1* | 12/2015 | Namata | G06Q 30/0277 709/224 |
| 2015/0372912 A1* | 12/2015 | Parla | H04L 61/5007 709/245 |
| 2016/0044054 A1* | 2/2016 | Stiansen | H04L 63/1416 726/24 |
| 2016/0057165 A1* | 2/2016 | Thakar | H04L 63/1425 726/24 |
| 2016/0065611 A1* | 3/2016 | Fakeri-Tabrizi | H04L 63/1441 726/23 |
| 2016/0099852 A1* | 4/2016 | Cook | H04L 43/08 709/224 |
| 2017/0295187 A1* | 10/2017 | Havelka | H04L 63/1441 |
| 2018/0063162 A1* | 3/2018 | Baughman | H04L 63/1416 |
| 2018/0077117 A1* | 3/2018 | Hagen | H04L 63/0227 |
| 2018/0077120 A1* | 3/2018 | Baughman | H04L 67/563 |
| 2018/0109494 A1* | 4/2018 | Yu | H04L 63/1425 |
| 2018/0115582 A1* | 4/2018 | Thakar | H04L 63/1466 |
| 2018/0124020 A1* | 5/2018 | Rodriguez | H04L 63/1425 |
| 2018/0139171 A1* | 5/2018 | Klitenik | H04L 61/2592 |
| 2018/0139235 A1* | 5/2018 | Desai | H04L 63/1483 |
| 2018/0176232 A1* | 6/2018 | Rodriguez | H04L 61/4511 |
| 2018/0278633 A1* | 9/2018 | Brutzkus | H04L 61/5007 |
| 2018/0288086 A1* | 10/2018 | Amiri | G06N 3/082 |
| 2018/0343272 A1* | 11/2018 | Khalil | G06F 21/56 |
| 2018/0351972 A1* | 12/2018 | Yu | H04L 63/1416 |
| 2018/0351974 A1* | 12/2018 | Baughman | G06N 3/08 |
| 2019/0058718 A1* | 2/2019 | Pangeni | H04L 63/1425 |
| 2019/0068634 A1* | 2/2019 | Fakeri-Tabrizi | H04L 63/1425 |
| 2019/0081952 A1* | 3/2019 | Wood | H04L 63/1491 |
| 2019/0095512 A1* | 3/2019 | Mahjoub | H04L 43/0876 |
| 2019/0130100 A1* | 5/2019 | Dymshits | G06F 16/90335 |
| 2019/0163903 A1* | 5/2019 | Thakar | G06F 21/56 |
| 2019/0164071 A1* | 5/2019 | Paugh | G06N 5/046 |
| 2019/0238562 A1* | 8/2019 | Manadhata | H04L 63/101 |
| 2019/0297161 A1* | 9/2019 | Ayyadevara | H04L 67/563 |
| 2020/0014714 A1* | 1/2020 | Mortensen | H04L 63/1483 |
| 2020/0112571 A1* | 4/2020 | Koral | G06N 3/08 |
| 2020/0112574 A1* | 4/2020 | Koral | H04L 63/1416 |
| 2020/0137021 A1* | 4/2020 | Janakiraman | H04L 61/4511 |
| 2020/0137024 A1* | 4/2020 | Janakiraman | H04L 63/0236 |
| 2020/0137093 A1* | 4/2020 | Janakiraman | H04L 63/0263 |
| 2020/0137094 A1* | 4/2020 | Janakiraman | G06N 20/00 |
| 2020/0137115 A1* | 4/2020 | Janakiraman | H04L 43/028 |
| 2020/0145454 A1* | 5/2020 | Galliano | H04L 61/4511 |
| 2020/0177606 A1* | 6/2020 | Valluri | H04L 63/0227 |
| 2020/0195669 A1* | 6/2020 | Karasaridis | G06N 3/088 |
| 2020/0228500 A1* | 7/2020 | Olumofin | H04L 63/0236 |
| 2020/0259851 A1* | 8/2020 | Manoselvam | H04L 63/1425 |
| 2020/0267182 A1* | 8/2020 | Highnam | G06N 3/08 |
| 2020/0287867 A1* | 9/2020 | Knecht | H04L 67/10 |
| 2020/0349430 A1* | 11/2020 | Schmidtler | G06N 3/0445 |
| 2020/0351242 A1* | 11/2020 | Huang | G06N 5/003 |
| 2020/0382341 A1* | 12/2020 | Oré | H04L 47/801 |
| 2021/0006537 A1* | 1/2021 | Gupta | H04L 61/3025 |
| 2021/0073661 A1* | 3/2021 | Matlick | G06N 20/00 |
| 2021/0185092 A1* | 6/2021 | Narayanaswamy | H04L 63/1408 |
| 2021/0243214 A1* | 8/2021 | Plonka | H04L 61/4511 |
| 2021/0250332 A1* | 8/2021 | Moore | H04L 63/0245 |
| 2021/0392111 A1* | 12/2021 | Sole | H04L 63/0236 |
| 2021/0400061 A1* | 12/2021 | Antoniewicz | H04L 61/4511 |
| 2022/0070194 A1* | 3/2022 | Pon | H04L 61/4511 |
| 2022/0247624 A1* | 8/2022 | Johnson | G06Q 10/103 |
| 2022/0247781 A1* | 8/2022 | Mandrychenko | H04L 63/1425 |
| 2022/0263708 A1* | 8/2022 | Ramachandran | H04L 63/061 |
| 2022/0263852 A1* | 8/2022 | Crabtree | G06N 5/045 |

OTHER PUBLICATIONS

Homem, et al., "Harnessing Predictive Models for Assisting Network Forensic Investigations of DNS Tunnels", (2017), 17 pages, Annual ADFSL Conference of Digital Forensics, Security and Law.
Tatang, et al., "A Study of Newly Observed Hostnames and DNS Tunneling in the Wild", online: https://www.farsightsecurity.com/assets/documents/A_Study_of_Newly_Observed_Hostnames_and_DNS_Tunneling_in_the_Wild.pdf, Feb. 2019, 16 pages.

* cited by examiner

IDENTIFYING DNS TUNNELING DOMAIN NAMES BY AGGREGATING FEATURES PER SUBDOMAIN

RELATED APPLICATION

This application claims priority to U.S. Provisional Patent Application No. 62/925,041, filed on Oct. 23, 2019, entitled "IDENTIFYING DNS TUNNELING DOMAIN NAMES BY AGGREGATING FEATURES PER SUBDOMAIN" by Rodriguez et al., the contents of which are incorporated by reference herein.

TECHNICAL FIELD

The present disclosure relates generally to computer networks, and, more particularly, to identifying Domain Name System (DNS) tunneling domain names by aggregating features per subdomain.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

Control over an infected host can largely be mitigated or prevented though the use of a firewall or other intermediary security apparatus. However, one exploit to avoid detection of the control channel traffic is through the use of Domain Name Service (DNS) tunneling. More specifically, firewalls must keep port 53 open, to allow for DNS query traffic. DNS tunneling exploits this fact by concealing the control channel traffic within encrypted DNS traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a service computes a plurality of features of a subdomain for which a Domain Name System (DNS) query was issued. The service aggregates the plurality of computed features into a feature vector. The service uses the feature vector as input to a machine learning classifier, to determine whether the subdomain is a DNS tunneling domain name. The service provides an indication that the subdomain is a DNS tunneling domain name, when the machine learning classifier determines that the subdomain is a DNS tunneling domain name.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
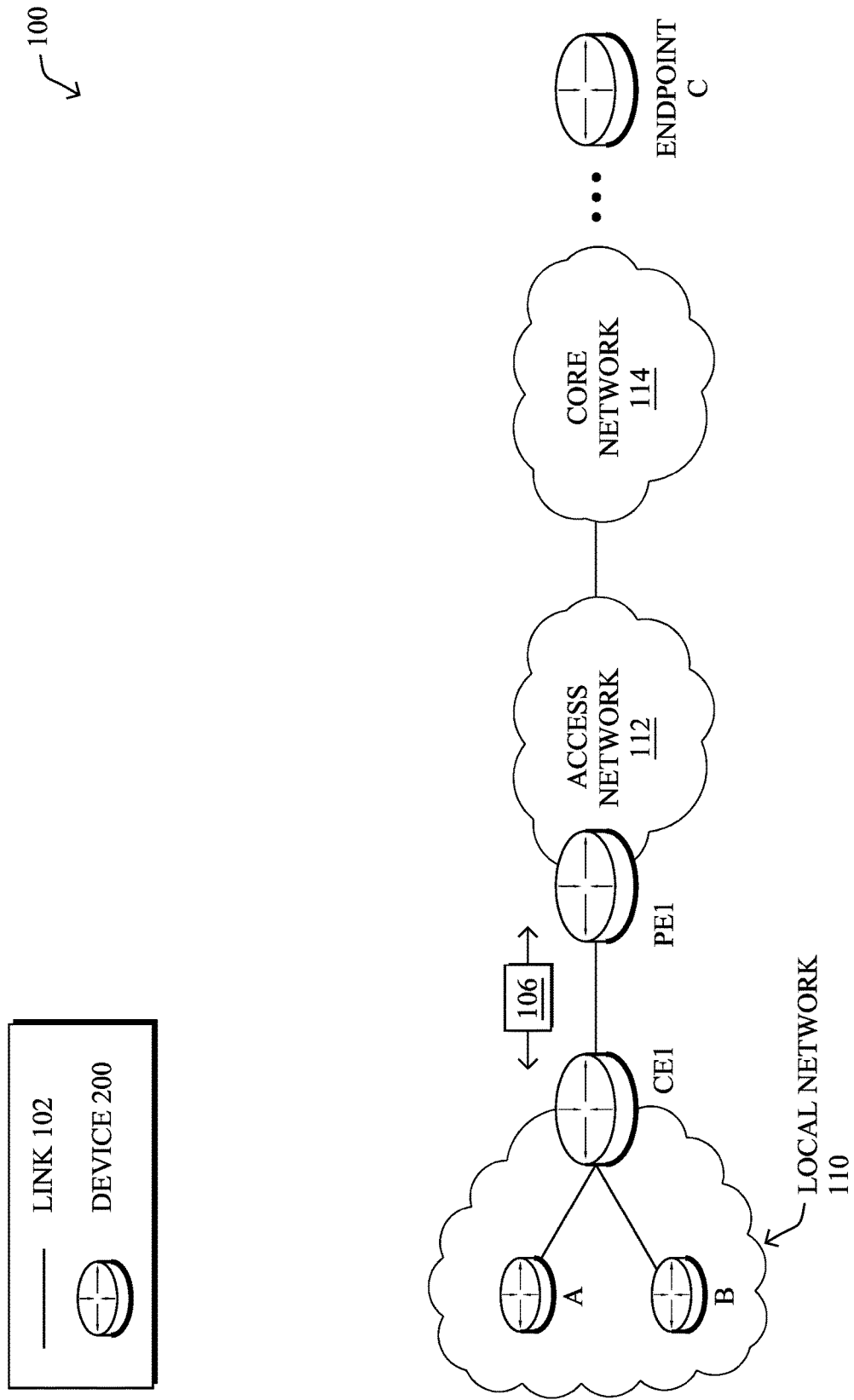
FIG. 1 illustrate an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the HTTPS protocol, to encrypt and decrypt data packets 106.

Figure 2:
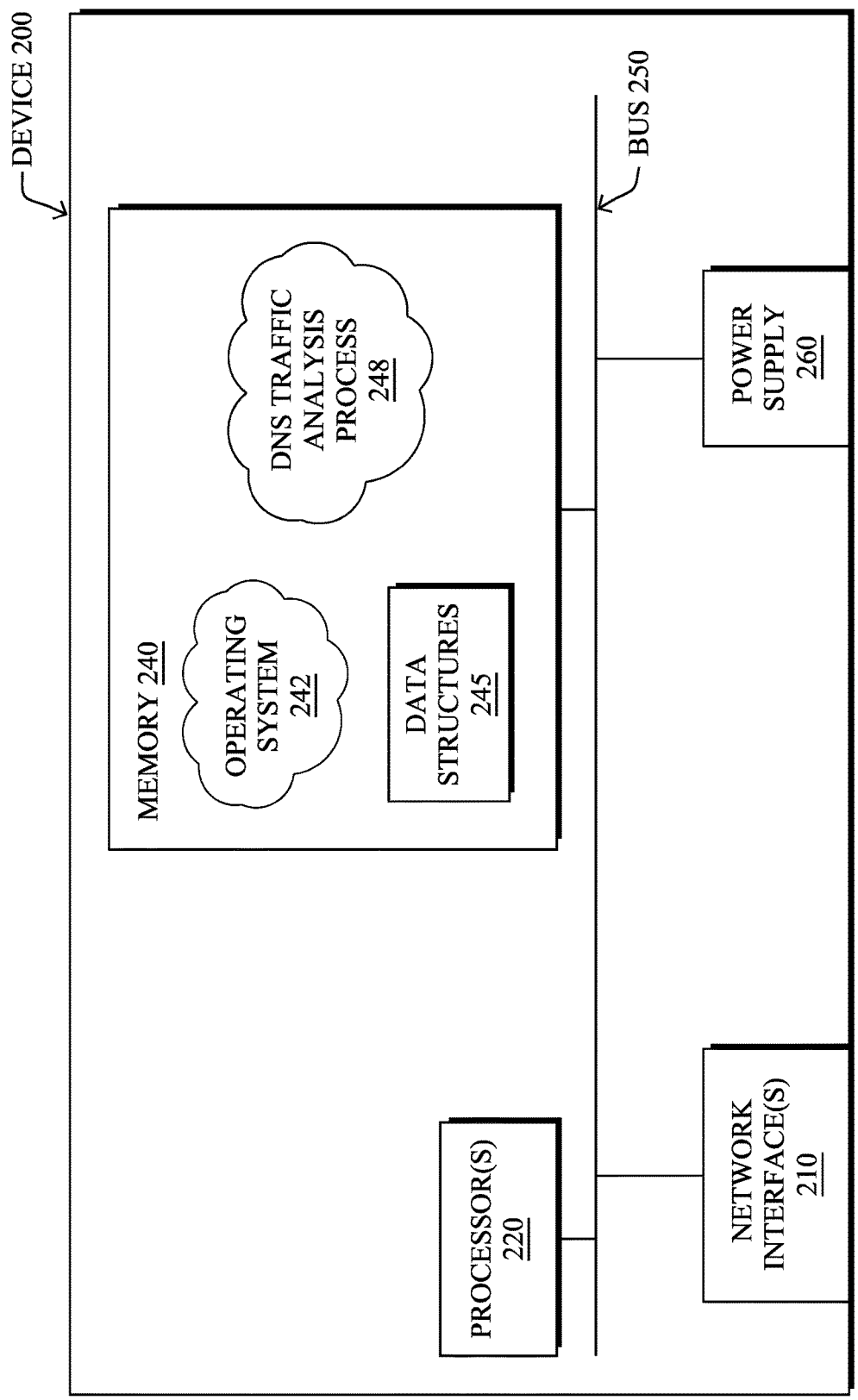
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a Domain Name System (DNS) traffic analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, DNS traffic analysis process 248 may also include computer executable instructions that, when executed by processor(s) 220, cause device 200 to detect domain names associated with DNS tunneling. To do so, in some embodiments, DNS traffic analysis process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, DNS traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample features of DNS traffic that has been labeled as "normal" or "DNS tunneling." On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that DNS traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly identified a domain name as associated DNS tunneling. Conversely, the false negatives of the model may refer to the number of times the model classified a domain name as associated with normal DNS traffic, when the traffic is indeed related to DNS tunneling. True negatives and positives may refer to the number of times the model correctly determined that a domain name was normal/benign or associated with DNS tunneling, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, botnets represent a security concern for network administrators. Once a client device has been infected with malware for the botnet, it may communicate with a malicious server which sends control commands to the infected device and/or collects data exfiltrated by the infected client. If the address of the malicious server is hardcoded into the malware itself, preventing operation of the botnet becomes a trivial task. Notably, all an administrator would need to do is block the address of the malicious server, to prevent the infected client device from communicating with the malicious server.

Since DNS traffic cannot be blocked arbitrarily without disrupting the DNS mechanism, some malware exploits this fact through the use of DNS tunneling. In general, DNS tunneling involves concealing communications between an infected client and a malicious server within DNS traffic.

Figure 3A:
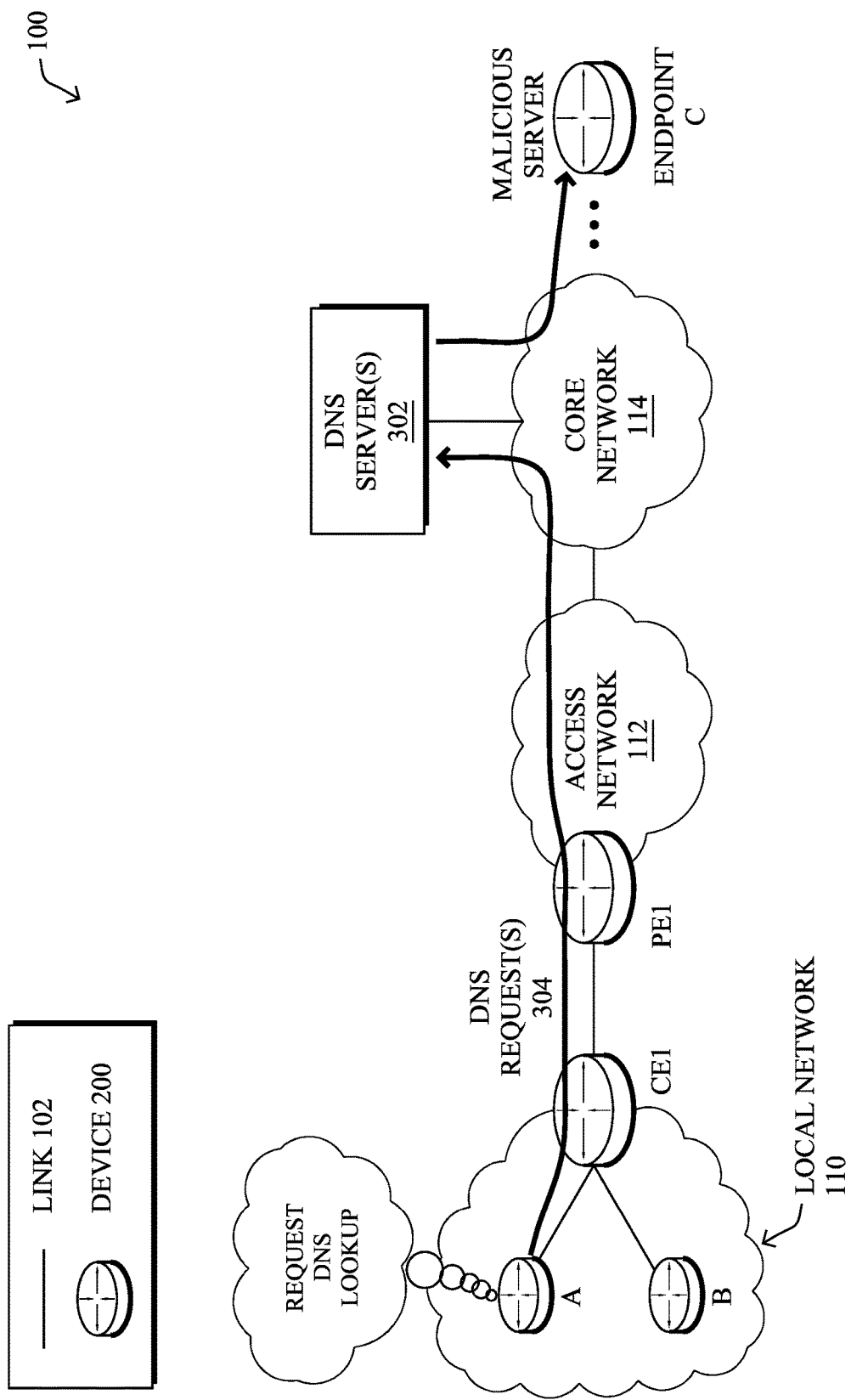
FIGS. 3A-3B illustrate an example of a domain name system (DNS) lookup.
Figure 3B:
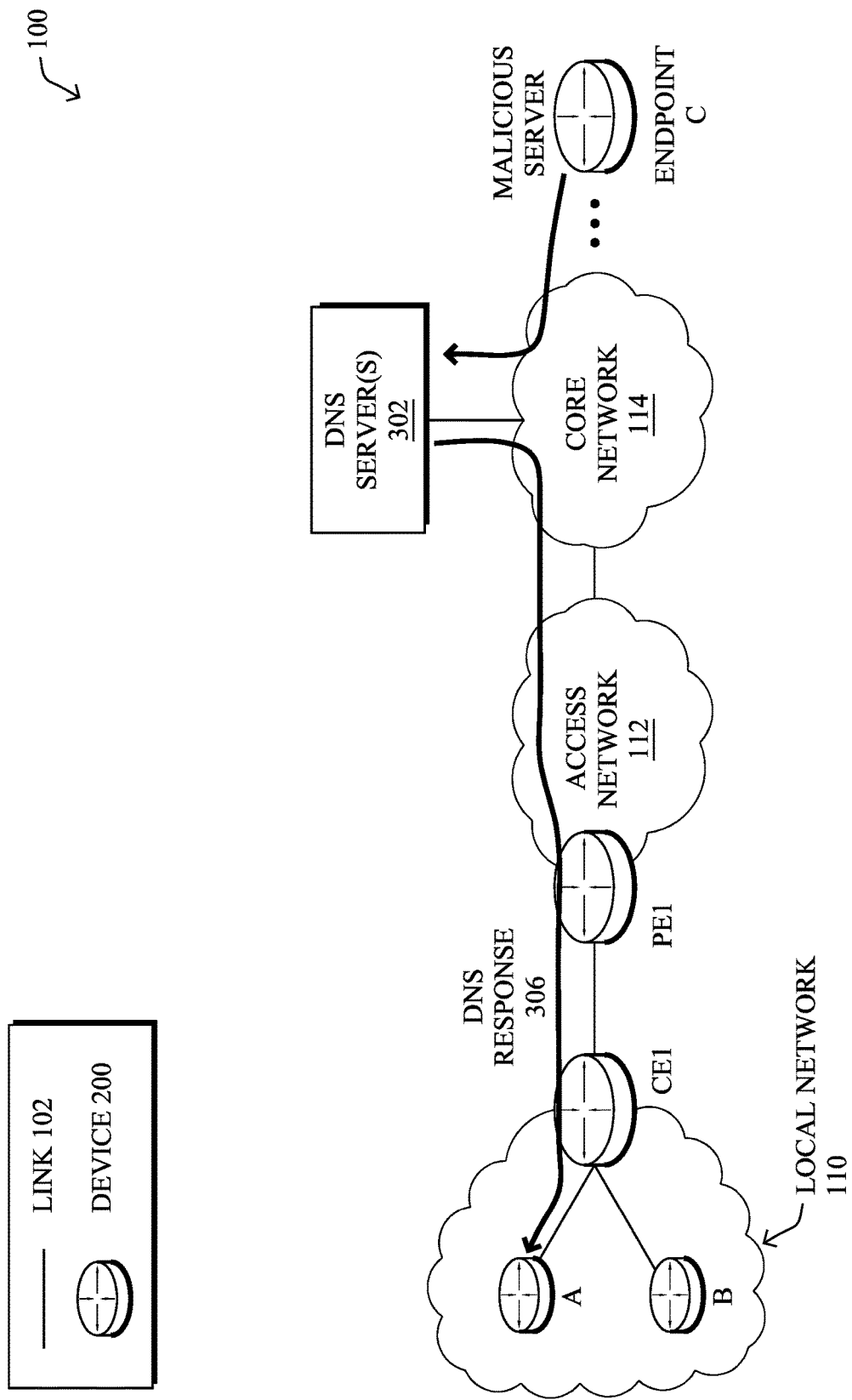

FIGS. 3A-3B illustrate an example of a domain name system (DNS) lookup. As shown, assume that client device A has been infected with malware that is to communicate with a malicious server, such as endpoint device C. To do so, client A may send a DNS request 304 that includes whatever information it wishes to convey to the malicious server. For example, assume that client A issues DNS request 304 for exfiltrateddata.server5.foo.com. Such a request will automatically be routed to a DNS server 302.

In response to receiving DNS request 304, DNS server 302 will perform a lookup of the A record that maps the requested domain of request 304 to an IP address and forward request 304 on to the malicious server. This can be done, for example, by endpoint device C being configured as the authoritative DNS server for the indicated subdomain, such as server5.foo.com. By doing so, any DNS request for <data>.server5.foo.com will automatically be sent to the malicious server. In doing so, infected client A can effectively pass data to the malicious server by including it via exfiltrateddata (which can vary with the conveyed message in the <data> portion of the address), such as data exfiltrated from network 110 by the infected client A.

FIG. 3B illustrates an example of the DNS response 306 sent in response to DNS request 304. To communicate data back to the infected client A, the malicious server may similarly leverage the DNS mechanism to conceal its messages. For example, when the malicious server sends DNS response 306 back to DNS server 302 and on to client A, it may include its own message, such as a control command, in the text field of response 306. To avoid detection, this information is typically encrypted, defeating approaches that try to detect DNS tunneling traffic by assessing the payloads of the DNS traffic. Accordingly, the ability to quickly discern whether a given subdomain is likely a DNS tunneling domain can be leveraged to take corrective measures, such as blocking traffic to that domain, generating security alerts, or the like.

Identifying DNS Tunneling Domain Names by Aggregating Features Per Subdomain

The techniques herein introduce machine learning-based approach to identifying DNS tunneling domain names by aggregating features per subdomain. In some aspects, a machine learning classifier can be trained to detect DNS tunneling domains based on training dataset of DNS tunneling domains. In turn, the classifier can be used to determine whether a particular subdomain is a DNS tunneling domain, based on the features of the subdomain.

Specifically, according to one or more embodiments of the disclosure as described in detail below, a service computes a plurality of features of a subdomain for which a Domain Name System (DNS) query was issued. The service aggregates the plurality of computed features into a feature vector. The service uses the feature vector as input to a machine learning classifier, to determine whether the subdomain is a DNS tunneling domain name. The service provides an indication that the subdomain is a DNS tunneling domain name, when the machine learning classifier determines that the subdomain is a DNS tunneling domain name.

Illustratively, the techniques described herein may be performed by hardware, software, and/or firmware, such as in accordance with the DNS traffic analysis process 248, which may include computer executable instructions executed by the processor 220 (or independent processor of interfaces 210) to perform functions relating to the techniques described herein.

Operationally, a service in a network may analyze DNS query logs, to identify any queried subdomain that is a DNS tunneling domain (e.g., via execution of process 248). In various embodiments, the service may identify payload labels for encrypted messages, as well subdomain patterns, such as any or all of the following:

long-to-short subdomain combinations
string-to-digit subdomain combinations
random strings-to-English word subdomain combinations
another language)
etc.

In various embodiments, the service may first compute a plurality of features of a subdomain under scrutiny. These features may include any or all of the following:

Digit count—e.g., a count of the digits, 0-9, that appear in the subdomain
Alphabetic character count—e.g., a count of the letters, A-Z, that appear in the subdomain
Hexadecimal character count—e.g., a count of the hexadecimal characters. 0-F, that appear in the subdomain. This is particularly useful in the case of the DNScat-B tool used to generate DNS tunneling domains.
Whitespace character alternative count—e.g., a count of dots, clashes, and other special characters, which may be due to the DNS resolver encoding non-ASCII characters.
Character transition count—e.g., a count of the number of transitions in the subdomain between alphabetic and non-alphabetic characters. For example, 1a2b3c4d has a character transition count of 4. This captures whether digits or characters are more uniformly random.
Digit run length—e.g., the maximum number of consecutive digits that appear in the subdomain.
Alphabetic character run length—e.g., the maximum number of consecutive alphabetic characters that appear in the subdomain.
Unigram entropy—e.g., a measure of whether the subdomain has few or many individual characters.
Bigram entropy—e.g., a measure of how frequently the subdomain uses a two-character combination.

Figure 4:
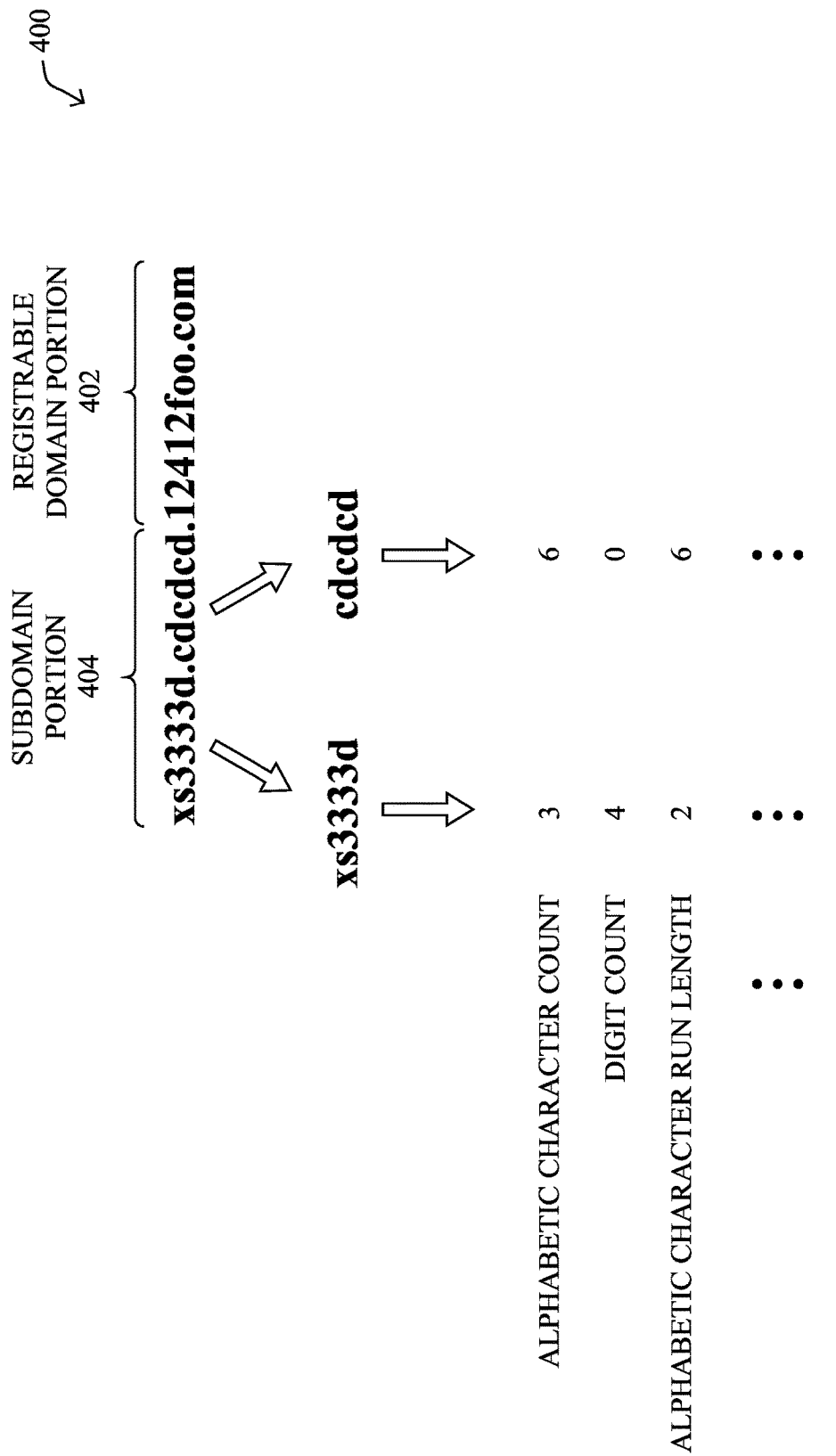
FIG. 4 illustrates an example of the computation of features of a subdomain.

By way of example, consider the case shown in FIG. 4. As shown, assume that a DNS record (or intercepted DNS traffic) indicates that a query was issued for subdomain name

400, xs3333d.cdcdcd.12412foo.com. As would be appreciated, subdomain name 400 may comprise the following components:

Registrable domain 402—this portion of subdomain name 400 is the address that is actually registered with the DNS service and comprises the top-level domain, .com, as well as the second level domain portion, 12412foo.

Subdomain portion 404—this portion of subdomain name 400 indicates the subdomain of domain 402, xs3333d.cdcdcd., which is not actually registered with the DNS service.

To compute the features of subdomain name 400, the service may first parse out its subdomain portion 404 from its registrable domain 402. In turn, in various embodiments, the service may compute various features of subdomain portion 404, potentially on a per-label basis. For example, as shown, the service may individually assess the features of the xs3333d label and the cdcdcd label of subdomain portion 404. For example, the alphabetic character count for the xs3333d label is 3, as it contains the alphabetic characters {x, s, d}. Similarly, the alphabetic character count for the cdcdcd label is 6, as all six characters in the label are alphabetic characters.

In terms of digit counts, the service may determine that the xs3333d label has a digit count of 4, as it includes the sub-string '3333'. Similarly, the service may determine that the cdcdcd label has a digit count of 0, as it does not include any digits.

As a further example, the service may determine that the xs3333d label has an alphabetic character run length of 2, as its longest substring of alphabetic characters, 'xs,' includes only two characters. Similarly, the service may determine that the cdcdcd label has an alphabetic character run length of 6, as this string only includes alphabetic characters.

Figure 5:
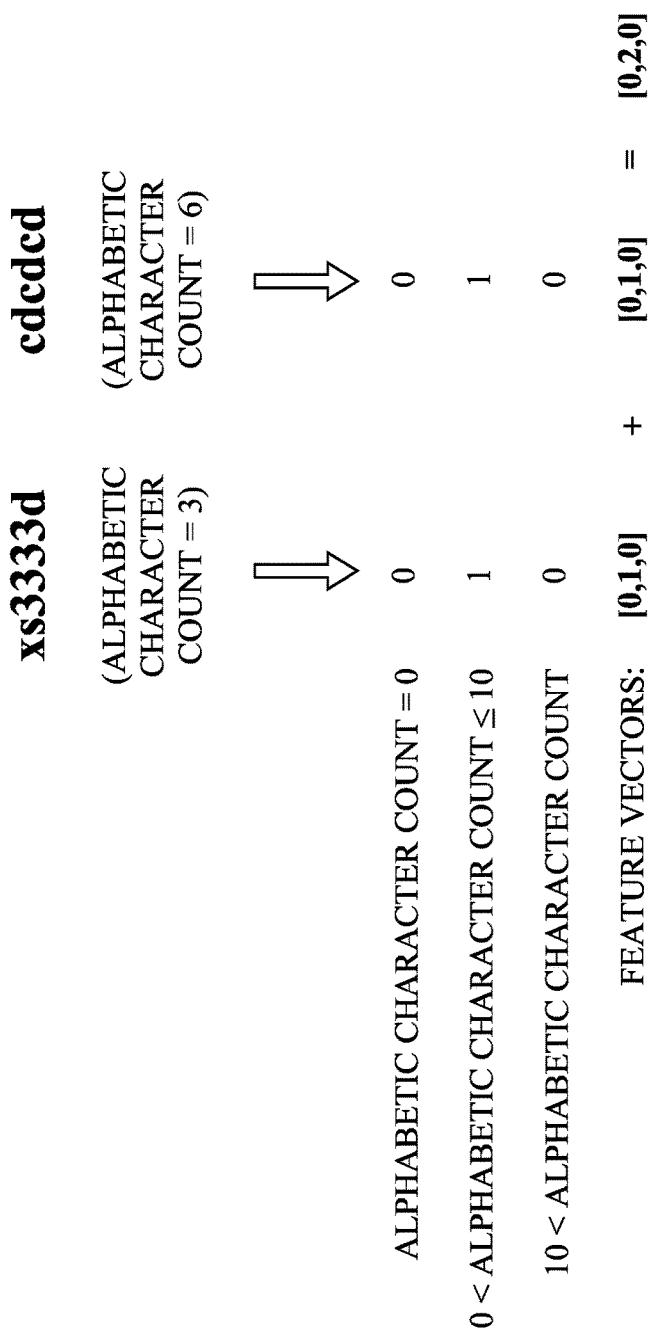
FIG. 5 illustrates an example of the bucketization of subdomain features.

According to various embodiments, the service may aggregate the computed features of subdomain name 400 into a feature vector. To do so, in one embodiment, the service may employ a bucketizing/histogram-based approach in which the service compares the computed features to ranges of values. FIG. 5 illustrates an example 500 of such an approach.

As shown in FIG. 5, and continuing the example of FIG. 4, assume that the service has predefined ranges (e.g., 'buckets') for the alphabetic character count feature as follows:

Bucket 1—if the alphabetic character count is zero.
Bucket 2—if the alphabetic character count is greater than zero, but less than or equal to ten.
Bucket 3—if the alphabetic character count is greater than ten.

In turn, the service may assign Boolean values to each bucket, potentially on a per label basis, based on the alphabetic character count for that label. Thus, both labels will be given a value of 0 for Bucket 1, values of 1 for Bucket 2, since they have alphabetic character counts of 3 and 6, respectively, and values of 0 for Bucket 3.

As a result of the above bucketization, the alphabetic character count for each subdomain label can be represented as a feature vector. Indeed, based on the bucketization, the alphabetic character count for the xs.3333d label can be represented as the vector [0, 1, 0]. Similarly, the alphabetic character count for the cdcdcd label can be represented as the vector [0, 1, 0].

In some embodiments, the service may aggregate the resulting feature vectors into a final feature vector by concatenating their values. For example, the combined feature vector for the alphabetic character count could be represented as [0, 1, 0, 0, 1, 0], in some cases. However, this approach fails to take into account the fact that there may be any number of labels within the subdomain portion of the domain name.

In a further embodiment, as shown, the service may aggregate the feature vectors into an aggregated feature vector by performing component-wise addition on the feature vectors. Thus, the combined feature vector for the alphabetic character counts of the subdomain portion under analysis is [0, 1, 0]+[0, 1, 0]=[0, 2, 0]. Such a vector is also sometimes referred to as a histogram. In turn, the service may employ a similar approach to aggregate each of the computed features (e.g., digit count, etc.) and then aggregate the resulting set of features into one feature vector (e.g., by concatenating the different feature vectors).

Referring again briefly to FIG. 4, the service may also perform some feature analysis on the registerable portion 402 of name 400. In various embodiments, the service may do so by tokenizing the characters of at least the second level domain portion, 12412foo, the entire registrable domain portion 402, or the entire name 400. For example, the service may convert 12412foo.com using the techniques herein into DDDDDwwwOwww., where D-represents a digit, w-represents an alphabetic character, and O-represents another symbol. In turn, the service may compute any or all of the features described previously for inclusion in the finalized feature vector. As would be appreciated, this new string has patterns that are easier to recognize by a machine learning model.

According to various embodiments, once the service has computed an aggregated feature vector for the subdomain name, it may use the feature vector as input to a machine learning classifier that has been trained to determine whether the subdomain is a DNS tunneling domain name. For example, such a classifier may take the form of a random forest, a generalized linear model, a neural network classifier, or any other suitable form of machine learning classifier.

To train the classifier, one or more DNS tunneling tools may be executed, to generate a plurality of DNS tunneling subdomains, which may be labeled as such. In turn, the service may compute feature vectors for each of these subdomains and include them in a training dataset on which the classifier is trained. In some embodiments, the training dataset may also include example feature vectors for subdomains that are likewise known to not be DNS tunneling domains (e.g., mail.google.com, etc.). Testing has shown that the encoding schemes used by many DNS tunneling tools tend to favor different characters or digits. Thus, in further embodiments, if a DNS tunneling tool is known to favor the alphabetic characters [a-f] and digits [0-5], a mask can also be created to make pattern recognition even easier.

When the classifier determine that the subdomain is a DNS tunneling domain, service may provide an indication of this determination to any number of devices. For example, in one embodiment, the service may notify a security device, such as a firewall, of the determination, so as to block traffic associated with the subdomain and/or primary domain. In another embodiment, the service may provide the indication to a user interface as part of a report or list.

In summary, the techniques herein allow for the analysis of payload labels with encrypted messages, as well subdomain patterns, such as: long-to-short subdomain combinations, string-to-digit subdomain combinations, random strings-to-English word subdomain combinations, and more.

This provides a signature for a domain name with encrypted messages that can be recognized by a discriminatory machine learning model.

Preliminary testing of the techniques herein using a prototype model resulted in a confusion matrix as follows:

TABLE 1

|  | Predicted Label: 0 (non-tunneling) | Predicted Label: 1 (tunneling) |
|---|---|---|
| Actual: 0 | 32603 | 29 |
| Actual: 1 | 86 | 36266 |

From the confusion matrix above, it can be seen that e prototype classifier was able o achieve an accuracy of 99.83329%.

Figure 6:
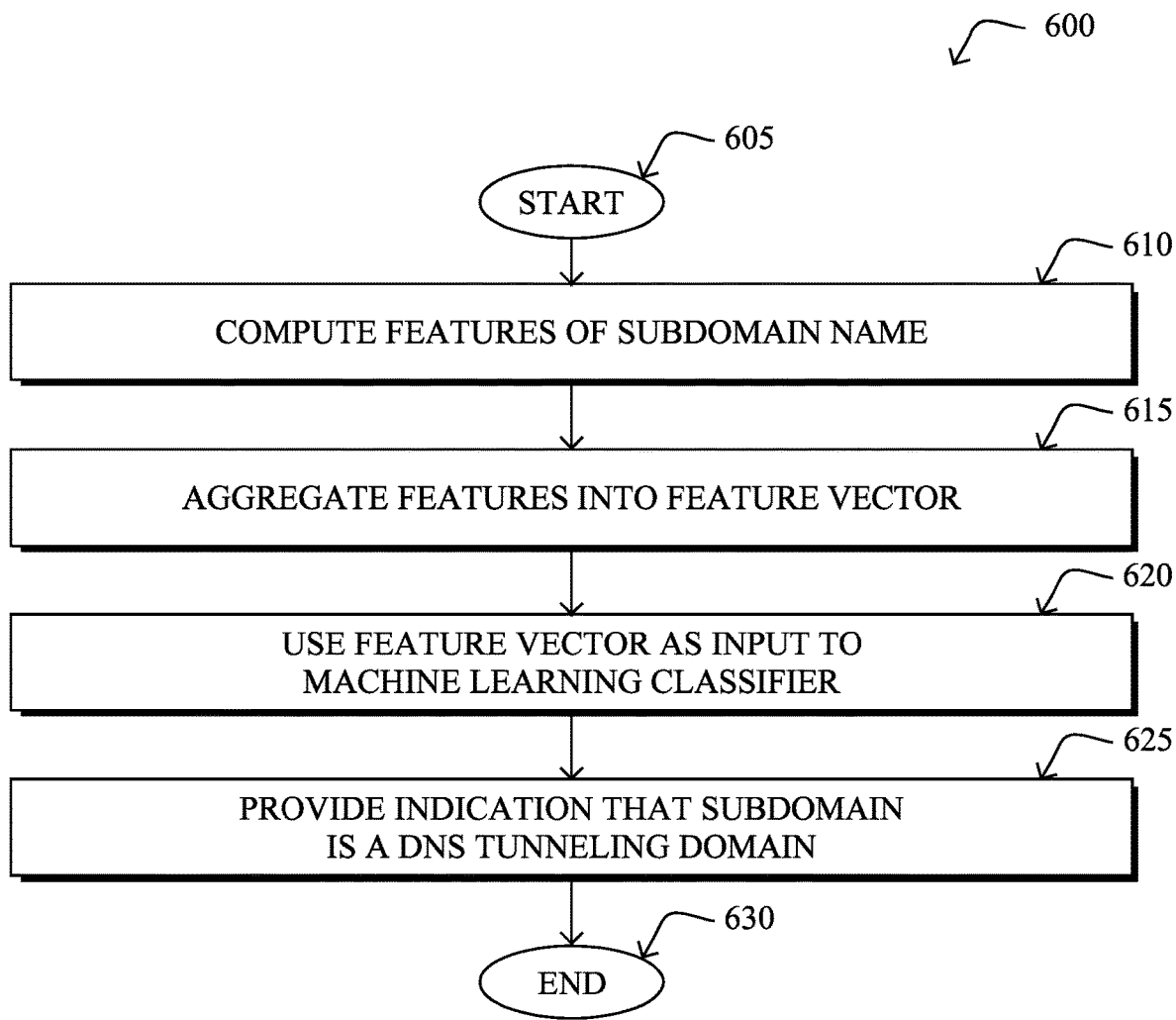
FIG. 6 illustrates an example simplified procedure for identifying a DNS tunneling domain.

FIG. 6 illustrates an example simplified procedure for identifying a DNS tunneling domain, in accordance with one or more embodiments described herein. The procedure 600 may start at step 605, and continues to step 610, where, as described in greater detail above, a service (e.g., a network assurance service, etc.) may compute a plurality of features of a subdomain for which a Domain Name System (DNS) query was issued. In various embodiments, the features may include any or all of the following: a hexadecimal character count for the subdomain, an alphabetic character count for the subdomain, a digit count for the subdomain, a special character count for the subdomain, a unigram entropy of the subdomain, a bigram entropy of the subdomain, a mean ratio of the unigram entropy to the bigram entropy, a digit run length of the subdomain, an alphabetic character run length of the subdomain, or a character transition count. In various embodiments, the service may compute such features only for the subdomain portion of the queried name and may even do so on a per-label basis.

At step 615, as detailed above, the service may aggregate the plurality of features into a feature vector. In some embodiments, the service may do so by bucketizing the computed features by comparing them to ranges of values. Such ranges may be selected, for example, by plotting the distribution of each feature, for each class, and then selecting cutoffs that best isolate each class (e.g., 'tunneling' vs. 'non-tunneling'). Based on the bucketized features, the service can then form the feature vector as a histogram, in one embodiment.

At step 620, the service may use the feature vector as input to a machine learning classifier, to determine whether the subdomain is a DNS tunneling domain name, as described in greater detail above. Such a classifier may be trained, for example, by using a DNS tunneling tool to generate a plurality of DNS tunneling subdomains and training the classifier based on the generated subdomains.

At step 625, as detailed above, the service may provide an indication that the subdomain is a DNS tunneling domain name, when the machine learning classifier determines that the subdomain is a DNS tunneling domain name. For example, the service may notify one or more pieces of networking equipment (e.g., routers, firewalls, etc.), so as to block traffic associated with the identified tunneling domain. In a further example, an alert or other report could be sent to a user interface (e.g., to alert a security expert). Procedure 600 then ends at step 630.

It should be noted that while certain steps within procedure 600 may be optional as described above, the steps shown in FIG. 6 are merely examples for illustration, and certain other steps may be included or excluded as desired.

Further, while a particular order of the steps is shown, this ordering is merely illustrative, and any suitable arrangement of the steps may be utilized without departing from the scope of the embodiments herein.

The techniques described herein, therefore, allow for a service to discern between DNS tunneling domain names and non-tunneling domains through the use of machine learning.

While there have been shown and described illustrative embodiments that provide for the classification of a domain name as being a DNS tunneling domain, it is to be understood that various other adaptations and modifications may be made within the spirit and scope of the embodiments herein. For example, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   computing, by a service, a plurality of features of a subdomain for which a Domain Name System (DNS) query was issued;
   aggregating, by the service, the plurality of computed features into a feature vector;
   using, by the service, the feature vector as input to a machine learning classifier that has been trained using a training dataset comprising a plurality of DNS tunneling subdomains, to determine whether the subdomain is a DNS tunneling domain name; and
   providing, by the service, an indication that the subdomain is a DNS tunneling domain name, when the machine learning classifier determines that the subdomain is a DNS tunneling domain name.

2. The method as in claim 1, wherein the plurality of features includes at least one of: a hexadecimal character count for the subdomain, an alphabetic character count for the subdomain, a digit count for the subdomain, or a special character count for the subdomain.

3. The method as in claim 1, wherein the plurality of features includes at least one of: a unigram entropy of the subdomain, a bigram entropy of the subdomain, or a mean ratio of the unigram entropy to the bigram entropy.

4. The method as in claim 1, wherein the plurality of features includes at least one of: a digit run length of the subdomain or an alphabetic character run length of the subdomain.

5. The method as in claim 1, wherein aggregating the plurality of computed features into a feature vector comprises:
   bucketizing the features by comparing the computed features to ranges of values; and
   forming the feature vector as a histogram, based on the bucketized features.

6. The method as in claim 1, wherein the plurality of features includes a character transition count for the subdomain.

7. The method as in claim 1, wherein the machine learning classifier comprises a random forest classifier.

8. The method as in claim 1, wherein computing the plurality of features of the subdomain for which the DNS query was issued comprises:
tokenizing at least a second level domain associated with the subdomain into a tokenized string; and
computing features of the tokenized string.

9. The method as in claim 1, further comprising:
using a DNS tunneling tool to generate the plurality of DNS tunneling subdomains; and
training the machine learning classifier based on the generated plurality of DNS tunneling subdomains.

10. An apparatus, comprising:
one or more network interfaces to communicate with a network;
a processor coupled to the one or more network interfaces and configured to execute one or more processes; and
a memory configured to store a process executable by the processor, the process when executed configured to:
compute a plurality of features of a subdomain for which a Domain Name System (DNS) query was issued;
aggregate the plurality of computed features into a feature vector;
use the feature vector as input to a machine learning classifier that has been trained using a training dataset comprising a plurality of DNS tunneling subdomains, to determine whether the subdomain is a DNS tunneling domain name; and
provide an indication that the subdomain is a DNS tunneling domain name, when the machine learning classifier determines that the subdomain is a DNS tunneling domain name.

11. The apparatus as in claim 10, wherein the plurality of features includes at least one of: a hexadecimal character count for the subdomain, an alphabetic character count for the subdomain, a digit count for the subdomain, or a special character count for the subdomain.

12. The apparatus as in claim 10, wherein the plurality of features includes at least one of: a unigram entropy of the subdomain, a bigram entropy of the subdomain, or a mean ratio of the unigram entropy to the bigram entropy.

13. The apparatus as in claim 10, wherein the plurality of features includes at least one of: a digit run length of the subdomain or an alphabetic character run length of the subdomain.

14. The apparatus as in claim 10, wherein the apparatus aggregates the plurality of computed features into a feature vector by:
bucketizing the features by comparing the computed features to ranges of values; and
forming the feature vector as a histogram, based on the bucketized features.

15. The apparatus as in claim 10, wherein the plurality of features includes a character transition count for the subdomain.

16. The apparatus as in claim 10, wherein the machine learning classifier comprises a random forest classifier.

17. The apparatus as in claim 10, wherein the apparatus computes the plurality of features of the subdomain for which the DNS query was issued by:
tokenizing at least a second level domain associated with the subdomain into a tokenized string; and
computing features of the tokenized string.

18. The apparatus as in claim 10, wherein the process when executed is further configured to:
use a DNS tunneling tool to generate the plurality of DNS tunneling subdomains; and
train the machine learning classifier based on the generated plurality of DNS tunneling subdomains.

19. A tangible, non-transitory, computer-readable medium storing program instructions that cause a service to execute a process comprising:
computing, by the service, a plurality of features of a subdomain for which a Domain Name System (DNS) query was issued;
aggregating, by the service, the plurality of computed features into a feature vector;
using, by the service, the feature vector as input to a machine learning classifier that has been trained using a training dataset comprising a plurality of DNS tunneling subdomains, to determine whether the subdomain is a DNS tunneling domain name; and
providing, by the service, an indication that the subdomain is a DNS tunneling domain name, when the machine learning classifier determines that the subdomain is a DNS tunneling domain name.

20. The computer-readable medium as in claim 19, wherein aggregating the plurality of computed features into a feature vector comprises:
bucketizing the features by comparing the computed features to ranges of values; and
forming the feature vector as a histogram, based on the bucketized features.

* * * * *

UNITED STATES PATENT AND TRADEMARK OFFICE
CERTIFICATE OF CORRECTION

| | |
|---|---|
| PATENT NO. | : 11,595,357 B2 |
| APPLICATION NO. | : 16/816797 |
| DATED | : February 28, 2023 |
| INVENTOR(S) | : David Brandon Rodriguez et al. |

It is certified that error appears in the above-identified patent and that said Letters Patent is hereby corrected as shown below:

In the Specification

Column 6, Line 33, please amend as shown:
(or to another language)

Column 6, Line 44, please amend as shown:
decimal characters, 0-F, that appear in the subdomain.

Column 6, Line 48, please amend as shown:
dots, dashes, and other special characters, which may Column 7, Line 60, please amend as shown:
alphabetic character count for the xs3333d label can be Column 8, Line 55, please amend as shown:
DNS tunneling domain, the service may provide an indication Column 9, Line 14, please amend as shown:
From the confusion matrix above, it can be seen that the Column 9, Line 15, please amend as shown:
prototype classifier was able to achieve an accuracy of Signed and Sealed this
Eleventh Day of April, 2023

Katherine Kelly Vidal
*Director of the United States Patent and Trademark Office*